Oct. 11, 1960     W. C. MOELLER ET AL     2,955,982
CONTINUOUS PROCESS FOR INTERNALLY REINFORCING SALT TABLETS
Original Filed Jan. 22, 1951                    2 Sheets-Sheet 2
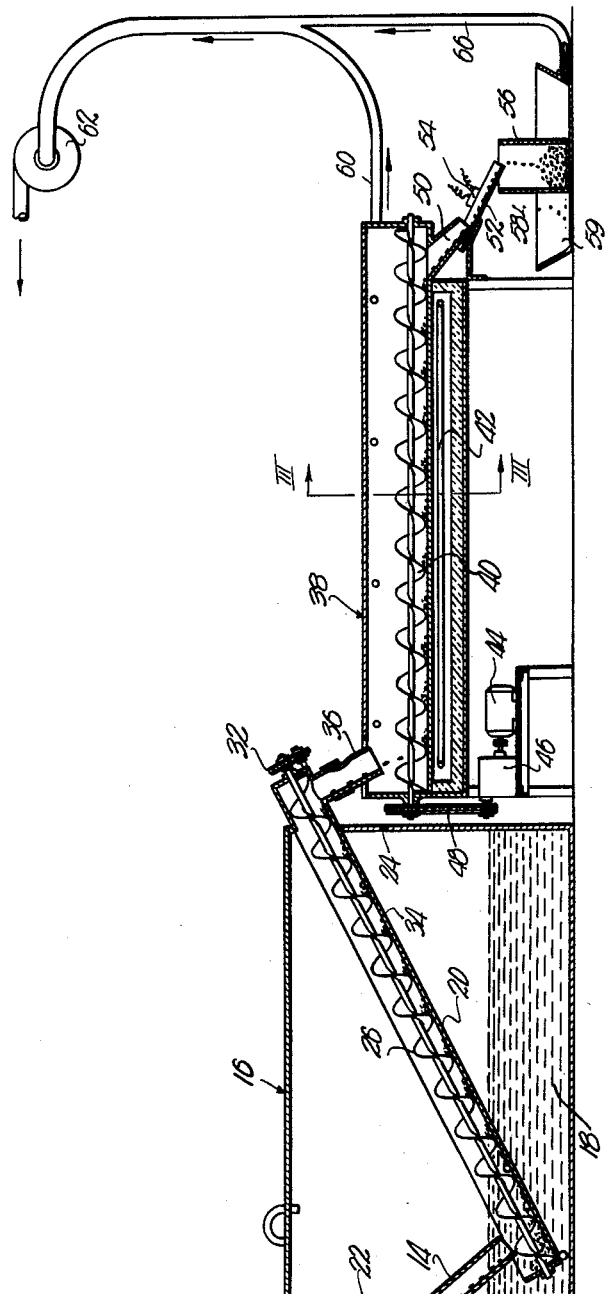
Fig. 2.
INVENTOR
WILLIAM C. MOELLER,
LUDWIG A. SMITH, DECEASED,
BY LOUISE R. SMITH, LUDWIG A. SMITH, JR.,
FRANCES D. SMITH & MARGARET L. SMITH, HEIRS
BY
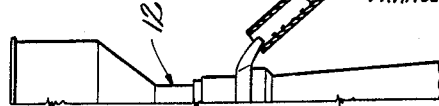
ATTORNEY United States Patent Office 2,955,982
Patented Oct. 11, 1960

2,955,982

CONTINUOUS PROCESS FOR INTERNALLY REINFORCING SALT TABLETS

William C. Moeller, Kansas City, Mo., and Ludwig A. Smith, deceased, late of Kansas City, Mo., by Louise R. Smith, Ludwig A. Smith, Jr., Frances D. Smith, and Margaret L. Smith, all of Silver Spring, Md., heirs; said Wm. C. Moeller and said Ludwig A. Smith assignors to Parmelee Pharmaceutical Company, Kansas City, Mo., a corporation Original application Jan. 22, 1951, Ser. No. 207,078. Divided and this application Oct. 22, 1957, Ser. No. 692,021

9 Claims. (Cl. 167—82)

This invention relates to a process for preparing ingestible tables and more particularly to a method of internally reinforcing tableted particles of salt so as to render the same more slowly soluble and thereby preclude discomfort normally caused by quick dissolution of the tablet in the stomach.

As is well known, salt tablets have been used for some time to combat heat exhaustion and excessive sweating, and although the introduction of sodium chloride into a person's system has proved beneficial in most instances, the widespread use of salt tablets has been greatly limited as many persons develop epigastric discomfort, nausea, or vomiting because of the rapid disintegration and absorption of the tablets in the stomach.

As was disclosed in U.S. Letters Patent No. 2,478,182, of August 9, 1949, in the name of William V. Consolazio, a method has been developed of internally reinforcing compressed tablets of sodium chloride to render the tablets more slowly soluble in the intestinal tract. The method described therein involves coating or impregnating the tablets with a material composed of cellulose acetate and/or cellulose nitrate so as to form a water-insoluble, non-toxic, permeable, membranous film around a multiplicity of groups of salt particles contained therein, the film being readily eliminated from the system by excretion in the feces.

The method described by Consolazio involved compressing the tablets into a self-sustaining mass, dipping of the same into a solution composed of a cellulosic derivative and a solvent therefor, subsequent removal, and drying at a temperature sufficient to remove the solvent therefrom. Although this process was found to be operable, it was not commercially feasible from an economic standpoint because the cost of producing tablets was too high to be practicable in a highly competitive market. Manifestly, the tablets must be capable of being manufactured at a minimum cost because they are for the most part, purchased and used by large industrial concerns and the armed services who distribute them without cost to their employees and members.

It is, therefore, the most important object of this invention to provide an economically practicable method of producing slowly soluble, internally reinforced sodium chloride tablets by impregnation with materials as disclosed in the said Consolazio patent.

A further important object of this invention relates to the provision of a process for internally reinforcing salt tablets with a cellulosic derivative wherein the tablets are continuously advanced along a predetermined path of travel through a plurality of zones whereby an uninterrupted stream of the tablets may be subjected to the film forming material and then subsequently dried, ready for use.

Another important object of this invention relates to a continuous process for internally reinforcing salt tablets as set forth immediately above wherein the tablets are continuously tumbled as they are advanced along the designated path through the treatment zone to thereby facilitate impregnation and drying of the same.

Also an important object of this invention relates to the provision of a method of internally reinforcing salt tablets by submerging the latter in a solution containing a cellulosic derivative and a solvent therefor and wherein the temperature of the solution is maintained lower than the temperature of the tablets at the moment the latter are submerged in the liquid to thereby facilitate impregnation of the tablets.

An equally important object of this invention relates to the provision of a process for preparing slowly soluble salt tablets as referred to above wherein a zone of vapor is maintained above the solution so that as the tablets are removed from the solution and held thereabove to drain excess solution from the same, there is less tendency for the film on the outermost surface to skin and thus preclude subsequent removal of the volatile solvent contained in the tablet.

An additional important object of this invention relates to an economical and substantially continuous process for treating salt tablets to render the same more slowly soluble wherein the solvent removed from the tablets during the drying thereof is collected and redirected to the solution so that there is little if any solvent waste.

Other important objects of this invention will be obvious from the accompanying specification and drawings, from which it can be seen that:

Fig. 2 is a longitudinal, vertical, sectional view taken on line II—II of Fig. 1;

Fig. 3 is an enlarged, transverse, cross-sectional view taken on line III—III of Fig. 2; and Fig. 4 is a fragmentary, sectional view similar to Fig. 2 illustrating a modified embodiment of the invention.

Figure 1:
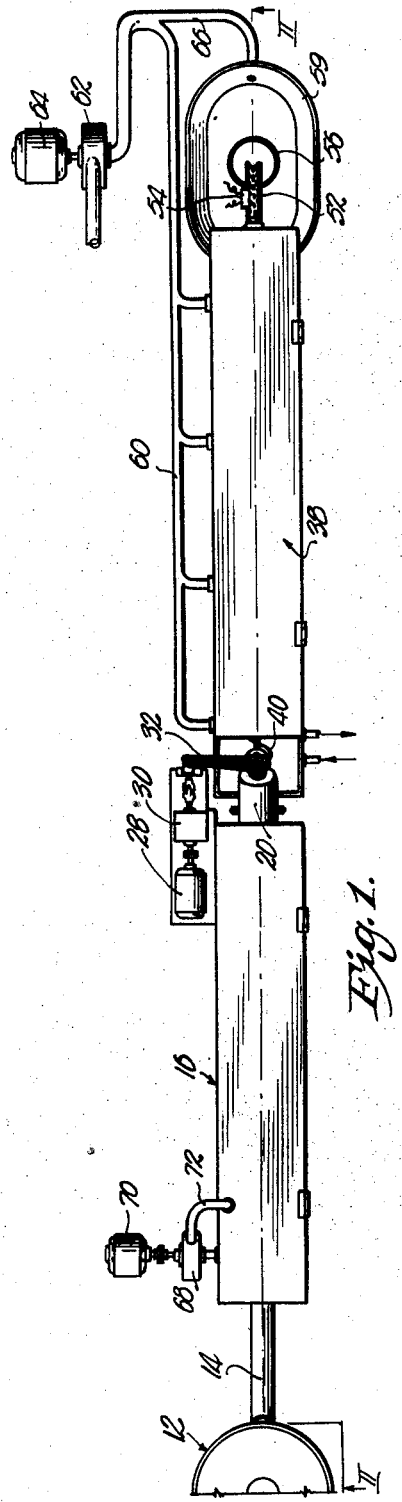
Figure 1 is a top plan view of apparatus for substantially uninterruptedly treating tablets of granular salt with a cellulosic material to internally reinforce the same.

Although the method herein disclosed is essentially adapted for the impregnation of sodium chloride tablets to internally reinforce the same, manifestly the process could be utilized for other similar tablets with various modifications and compensatory adjustments as may be necessary.

Briefly, the instant process contemplates continuously advancing and tumbling the tablets to be impregnated along a predetermined path through a plurality of successive treatment zones. By virtue of the provision of the equipment to be hereinafter described, the tablets to be treated may be introduced into the apparatus at one end thereof, impregnated with a special material, excess solution drained from the tablets after impregnation with the material, and the tablets subsequently dried so that a finished product ready for packaging emanates from the opposite end of the apparatus.

The first step in the method of the present invention for forming internally reinforced sodium chloride tablets consists of producing salt tablets 10 from particles of sodium chloride by die compression in a conventional tableting machine 12. Manifestly, the amount of salt contained in each tablet 10 will vary with the pressure of machine 12 and, inasmuch as it is desirable to have a highly porous, cellular tablet 10 which may be readily impregnated, it is extremely important that the pressure placed on tablets 10 in compression machine 12 be closely controlled. In order to render the tablets self-sustaining while still remaining in a highly porous condition it is preferable that the tablets be formed at a pressure within the range of 5 to 8 tons per square inch. Tablets compressed within this range may be easily impregnated with a suitable composition and are slowly soluble in the digestive tract.

The size of the sodium chloride particles for producing tablets 10 may vary and the tablets may be of any convenient dimensions but production of a standard 10 grain tablet meets many of the consumers' specifications.

In the embodiment of the present invention illustrated in Figs. 1 to 3 inclusive of the drawings, tablets 10 produced by compression tableting machine 12 are allowed to gravitate along an inclined tubular conduit 14 into a hollow tank broadly numbered 16. It can be appreciated that the time interval lapsing between the time the tablets 10 are produced in machine 12 and ultimately enter tank 16 is relatively short.

Tank 16 is most usually of rectangular configuration having an open top with a removable closure situated thereon, and is adapted to receive a liquid impregnating substance 18 which is maintained at a predetermined level within the tank 16 from a suitable supply distribution system not herein shown.

As disclosed in the Consolazio patent, various materials may be used for internally reinforcing the salt tablets, but the most effective impregnating or coating agents have been found to be cellulose derivatives, particularly cellulose acetate and cellulose nitrate. Also, as pointed out in the reference patent, best results were obtained from a low viscosity, high acetyl, cellulose acetate. For impregnating purposes, the cellulosic material is dissolved in a suitable solvent which may be readily removed by evaporation, most usually accomplished by heating and, although many types of solvents would be feasible, from a commercial standpoint acetone has been found to be the preferred material. A solution containing 30% cellulose acetate in acetone is the most desirable impregnating liquid. The salt tablets 10 directed into the cellulosic material 18 are channeled by conduit 14 into an elongated, open top trough 20 disposed within tank 16 at a diagonal angle, as is illustrated in Fig. 2. It can be seen that trough 20 is substantially longer than the diagonal, longitudinal length of tank 16 and therefore, the uppermost end of trough 20 extends through an opening provided therefor in one end wall 24 of tank 16. The lowermost end of trough 20 is disposed below the surface of liquid 18 so that as tablets are directed into trough 20 from conduit 14, they are submerged in liquid 18.

Since conduit 14 extends through end wall 22 of tank 16 and is disposed to direct tablets 10 into the lowermost end of trough 20 disposed adjacent the bottom of tank 16, it can be recognized that as tablets 10 are advanced upwardly in trough 20 by screw or helix conveyor 26, tablets 10 remain in liquid 18 for a relatively long period of time to effect complete impregnation of the same. Helix 26 is rotatably mounted in trough 20 and is actuated by a suitable prime mover such as an electric motor 28 coupled to a speed reducer 30, and an endless chain 32 which is in turn connected with the uppermost end of helix 26 exteriorly of tank 16 so that screw 26 is rotated at a predetermined speed to move tablets 10 up trough 20.

From the uppermost end of trough 20, impregnated tablets 34 are permitted to gravitate along an inclined outlet spout 36 at the uppermost end of trough 20 located exteriorly of tank 16, into an elongated, hollow drying compartment broadly numerated 38 that is also provided with a substantially horizontal, elongated helix or screw conveyor 40. Compartment 38 is also provided with a suitable heater 42 which extends longitudinally of helix 40 so as to drive solvent vapors from tablets 34.

Helix 40 is driven at a predetermined speed through the medium of a prime mover such as an electric motor 44, a speed reducer 46 and an endless coupling chain 48. Tablets 34 are advanced along the lowermost arcuate surface of compartment 38 and into an inclined outlet spout 50 where the dried tablets gravitate to a foraminous plate 52. A vibrator 54 may be provided on the plate 52 so that the dried tablets 34 will pass into a suitable receptacle 56. Because of the provision of plate 52, separation and sorting is accomplished inasmuch as undersized tablets 58 fall through the perforations of plate 52 into a larger container 59 within which receptacle 56 is disposed. Therefore, the tablets in receptacle 56 are ready for immediate packaging and shipment and no additional operations are necessary.

By virtue of the provision of the conveyors 26 and 40, it can now be appreciated that a substantially continuous process of impregnating tablets 10 is provided inasmuch as tablets 10 emanating from machine 12 describe a continuous path of travel until being deposited in receptacle 56. In other words, tablets 10 pass along a predetermined path of travel through the apparatus and are successively treated in a plurality of zones. In the first zone, the tablets 10 are submerged in liquid 18 so as to completely impregnate the same, and it is pointed out that it is desirable to maintain the temperature of liquid 18 at least as low as the temperature of tablets 10 at the moment the latter pass into solution 18. It is preferable, however, that the temperature of liquid 18 be maintained substantially below the temperature of tablets 10 as they gravitate into liquid 18 and, since the temperature of tablets 10 at the moment the latter enter solution 18 is substantially about 110° F., solution 18 should be maintained at approximately 90° F. Maintenance of the temperature differential between tablets 10 and liquid 18 is of importance because of the fact that as the relatively hot tablets 10 enter solution 18, which is kept at a lower temperature, cooling of tablets 10 causes the solution 18 to be pulled into the interstices of the cellular tablets 10 at a faster rate than would otherwise be effected. In other words, if tablets 10 were at a lower temperature than solution 18, because of the characteristics of the solvent in liquid 18 and the nature of the cellulosic derivative, the impregnation of tablets 10 would be somewhat retarded.

In order to maintain the proper temperature differential between tablets 10 and impregnating solution 18, tablets 10 may be heated by external means (not shown), although in actual practice it has been found that compression of the particles of sodium chloride in the stamping or tableting machine 12 heats the tablets 10 to a sufficient temperature that they are within the prescribed range at the time they enter solution 18. It can be appreciated that because of the relatively short path of conduit 14, as well as the substantially enclosed nature thereof, there is little loss of heat as tablets 10 gravitate from machine 12 into liquid 18.

The helix 26 advances tablets 10 up trough 20 into a second treatment zone located above the free surface of liquid 18 and in this zone, excess liquid 18 is drained from impregnated tablets 34 and which flows back into liquid 18. Manifestly, since tank 16 is a closed container, there is a zone of acetone vapor above the surface of liquid 18 within which the tablets 34 are disposed, and because of the maintenance of this vapor zone within which tablets 34 are located, there is less tendency for the cellulosic material present on the outermost surface of tablets 34 to skin or form a relatively hard outermost layer. The importance of this anti-skinning process will be hereinafter pointed out but it can be perceived that the cellulosic material remains in a relatively soft condition on the outermost surface of tablets 34.

As tablets 34 reach the uppermost end of trough 20, they are directed into a third treating zone via spout 36 wherein all volatile solvent material is removed from tablets 34. In the third treatment zone, the tablets are advanced continuously along the length of compartment 38 so that when the tablets reach spout 50, all solvent has been removed therefrom.

The apparatus herein described is adapted to impregnate and subsequently dry tablets 10 as they are continuously advanced along a predetermined path of travel and in this respect, it can be seen that the impregnation and drying can be varied at will by merely changing the revolutions per minute of helix 26 and helix 40 and by varying the temperature within compartment 38. Utilizing a 10-grain tablet 10 and a 30% solution of cellulose acetate in acetone, it is desirable to rotate helix 26 at a speed such that tablets 10 are submerged in liquid 18 for approximately 3 to 5 minutes and maintained in the zone above liquid 18 for a time so that the outermost coating on tablets 34 is kept relatively soft, but not such that tablets 34 become sticky and tend to agglomerate.

The speed of manufacture of tablets 34 may be tremendously increased through the use of heater 42 in compartment 38, and it has been found that by maintaining the temperature within compartment 38 at approximately 120° F. to 140° F., the solvent will be drawn off completely at a rapid rate and the tablets 34 emanating from spout 50 are in condition for packaging. The speed of rotation of helix 40 should preferably be regulated to maintain the tablets 34 within the chamber 38 for a period within the range of from 5 to 15 minutes so that all solvent is removed from tablets 34 in this third zone.

A more economical process may be produced by evacuation of compartment 38 so that the solvent vapor removed from tablets 34 may be redirected into solution 18 located within tank 16 and therefore, in this respect a manifold 60, coupled with compartment 38 is joined with a suitable suction blower 62 that is in turn driven by a prime mover 64. A line 66 also interconnects blower 62 and the container 59 for removing vapor fumes adjacent the outlet end of compartment 38, inasmuch as there is some tendency for the vapor to emanate from spout 50 and be collected in container 59. It can be ascertained that the outlet conduit of suction blower 62 may be connected to the means for directing cellulosic material into tank 16 and it is also of advantage to provide a suction pump 68 in communication with tank 16 near the bottom thereof, so that liquid 18 may be recirculated into tank 16 by means of pipe 72. Motor 70 is provided for driving suction pump 68 at a predetermined rate of speed.

Tablets 10, compressed into a self-sustaining body by machine 12 are internally reinforced by the cellulosic material by virtue of the material forming a water insoluble, non-toxic, permeable, membranous film around a multiplicity of groups of salt particles contained therein and therefore, the tablets are rendered slowly soluble in the intestinal tract as hereinbefore pointed out. The method of impregnating salt tablets as accomplished by the continuous process disclosed is materially improved by virtue of the fact that the tablets are continuously tumbled as they are moved through the plurality of treatment zones and therefore, all sides of the tablets are subjected to the various treatments with no tendency of agglomeration or the like.

It is imperative that the salt tablets 10 emanating from machine 12 be absolutely free of moisture and ordinarily, the heat derived by pressure in the machine 12 will remove the moisture content. However, in the event it is desired to further treat the tablets 10 so far as moisture content thereof is concerned, there may be provided conveyor tube 100 (Fig. 4) for receiving the tablets from the machine 12 by conduit 102 corresponding to conduit 14. The tube 100 in turn communicates with tank 104 corresponding to tank 16 by means of an inclined pipe 106. The salt tablets 10 are moved through the tube 100 by means of a horizontal helix conveyor 108 driven by motor 110 to discharge the tablets into the pipe 106 and thence into a foraminous receiving hopper 112 within tank 104. A plurality of strip-heating elements 114 within tube 100 supply the necessary heat to cause removal of the moisture from the salt tablets and a suction blower 116 communicating with the tube 100 draws off the humidity.

It is seen that the above method is adapted for impregnation of salt tablets by a substantially uninterrupted process which may be easily accomplished by one person overseeing the entire operation, and the tablets may be rendered substantially non-nauseating at a very low increase in unit price. The apparatus itself is of low cost, relatively inexpensive in maintenance and operation and is substantially free of intricate parts which are liable to break down. Although the preferred process has been set forth in detail herein, it is manifest that various modifications in the steps of procedure as well as the operating conditions can be made without departing from the concepts of this invention and therefore, it is intended to be limited only by the scope of the appended claims.

This is a division of application Serial No. 207,078, filed January 22, 1951 and now abandoned.

Having thus described the invention what is claimed as new and desired to be secured by Letters Patent is:

1. In a method of preparing an internally reinforced, slowly soluble salt tablet wherein a multiplicity of groups of salt particles are each surrounded by a membrane composed of a cellulosic derivative, the steps of compressing particles of salt into a self-sustaining, highly porous tablet; submerging the tablet in a liquid composition consisting essentially of a film forming cellulose derivative and a solvent therefor; maintaining the temperature of the liquid composition lower than the temperature of the tablet at the moment the latter is submerged in the liquid composition; removing the tablet from the liquid composition; allowing the excess of liquid to drain from the table; and thereafter drying the tablet.

2. A method as set forth in claim 1 wherein the difference between the temperatures of the tablet and liquid composition is about 20° F.

3. A method as set forth in claim 1 wherein the temperature of said tablet is about 110° F. and the temperature of said liquid composition is about 90° F.

4. In a method of preparing an internally reinforced, slowly soluble salt tablet wherein a multiplicity of groups of salt particles are each surrounded by a membrane composed of a cellulosic derivative, the steps of maintaining a bath of a liquid composition consisting essentially of a film forming cellulose derivative and a solvent therefor; maintaining a zone adjacent said bath of said solvent in vapor form; submerging the tablet in the bath; removing said tablet from the bath; and supporting the tablet in said vapor zone until excess liquid has drained therefrom whereby said zone of vapor retards skinning of the film on the surface of the tablet during the draining operation.

5. In a method of preparing an internally reinforced, slowly soluble salt tablet wherein a multiplicity of groups of salt particles are each surrounded by a membrane composed of a cellulosic derivative, the steps of compressing particles of salt into a self-sustaining, highly porous tablet; submerging the tablet in a liquid composition consisting essentially of a film forming cellulose derivative and a solvent therefor, the temperature of the liquid composition being maintained lower than the temperature of the tablet at the moment the later is submerged in the liquid composition; maintaining a vapor zone adjacent said liquid composition; removing the tablets from the liquid composition; supporting the tablet in said vapor zone until excess liquid has drained therefrom whereby said zone of vapor retards skinning of the film on the surface of the tablet during the draining operation; and thereafter drying the tablet.

6. In a process for preparing slowly soluble salt tablets wherein particles of salt are initially compressed into self-sustaining, highly porous tablets, the improved method of internally reinforcing the tablets by placing a membrane composed of a cellulosic derivative around a multiplicity of groups of salt particles contained therein which include the steps of substantially continuously advancing a plurality of the tablets along a predetermined path of travel through a plurality of zones; submerging the tablets in a liquid composition consisting essentially of a film forming cellulosic derivative and a solvent therefor in a first zone; removing the tablets from the same and supporting the tablets in another zone to drain excess liquid therefrom; and heating the tablets to a predetermined temperature in a third zone to dry the tablets by removing all of the solvent therefrom.

7. A method as set forth in claim 6 wherein the tablets are substantially continuously tumbled as they are continuously advanced through said plurality of zones.

8. A method as set forth in claim 6 wherein said solvent removed from the tablets in said third zone is collected and then directed to the liquid composition in the first zone.

9. In a process for preparing slowly soluble salt tablets wherein particles of salt are initially compressed into self-sustaining, highly porous tablets, the improved method of internally reinforcing the tablets by placing a membrane composed of a cellulosic material around a multiplicity of groups of salt particles contained therein which include the steps of substantially continuously advancing a plurality of the tablets along a predetermined path of travel through a plurality of zones; submerging the tablets at a first zone and while at a temperature of approximately 110° F. in a liquid composition at a temperature of approximately 90° F. and consisting essentially of a film-forming cellulosic material dissolved in a relatively volatile organic solvent therefor; removing the tablets from the composition and supporting the tablets in another zone to drain excess liquid therefrom; and heating the tablets to a temperature above the volatilization temperature of said solvent in a third zone to dry the tablets by removing all of the solvent therefrom.

References Cited in the file of this patent

UNITED STATES PATENTS

| | | |
|---|---|---|
| 1,690,760 | Volwiler | Nov. 6, 1928 |
| 2,410,110 | Taylor | Oct. 29, 1946 |
| 2,478,182 | Consolazio | Aug. 9, 1949 |
| 2,512,192 | Yen | June 20, 1950 |

OTHER REFERENCES

Rowell: "The Art of Coating Tablets," Drug and Cos. Ind., September 1948, vol. 63, No. 3, pp. 308, 309, 310, 411, 412, 413 and 414.